United States Patent [19]
Eddy

[11] Patent Number: 5,394,349
[45] Date of Patent: Feb. 28, 1995

[54] FAST INVERSE DISCRETE TRANSFORM USING SUBWORDS FOR DECOMPRESSION OF INFORMATION

[75] Inventor: Christopher R. Eddy, Arroyo Grande, Calif.

[73] Assignee: Xing Technology Corporation, Arroyo Grande, Calif.

[21] Appl. No.: 911,824

[22] Filed: Jul. 10, 1992

[51] Int. Cl.⁶ .............................................. G06F 7/38
[52] U.S. Cl. .................................................... 364/725
[58] Field of Search .............................. 364/725–726

[56] References Cited

U.S. PATENT DOCUMENTS

| | | | |
|---|---|---|---|
| 4,293,921 | 10/1981 | Smith, Jr. | 364/726 |
| 4,449,194 | 5/1984 | Wilhelm | 364/726 |
| 4,554,629 | 11/1985 | Smith, Jr. | 364/725 X |
| 4,646,256 | 2/1987 | Bracewell | 364/725 |
| 4,760,543 | 7/1988 | Ligtenberg et al. | 364/726 |
| 4,791,598 | 12/1988 | Liou et al. | 364/725 |
| 4,829,465 | 5/1989 | Knauer et al. | 364/726 |
| 4,831,574 | 5/1989 | Duhamel | 364/726 |
| 4,837,724 | 6/1989 | Borgers et al. | 364/726 |
| 4,849,922 | 7/1989 | Riolfo | 364/726 |
| 4,912,668 | 3/1990 | Aubie et al. | 364/726 |
| 5,008,848 | 4/1991 | Akiwumi-Assani | 364/725 |
| 5,253,192 | 10/1993 | Tufts | 364/726 |

Primary Examiner—Tan V. Mai
Attorney, Agent, or Firm—LaRiviere, Grubman & Payne

[57] ABSTRACT

A method for imparting to a general purpose (CISC), or reduced instruction set (RISC), type of central processing unit (CPU; microprocessor) the characteristics and performance of an integer arithmetic digital signal processor (DSP) which executes instructions acting upon multiple ("S") data elements in parallel. The method is applicable to all finite mathematical computations wherein product and sum terms (for example) will never overflow "1/S" fraction of total word width. "S" need not be a multiple of two, but the method is most useful when it is, such as in algorithms containing "butterfly" type computations. It may be used to advantage in the implementation of all discrete orthogonal transforms, and may be generalized to any size CPU word (e.g.: 16-bit, 32-bit, 64-bit, etc.) subject only to limits imposed by the range of vector spaces being handled. Specific applications include single and multiple dimensional Discrete Cosine Transform for image compression, and real and complex Fast Fourier Transform for coding of audio and similar time sequence data.

27 Claims, 11 Drawing Sheets

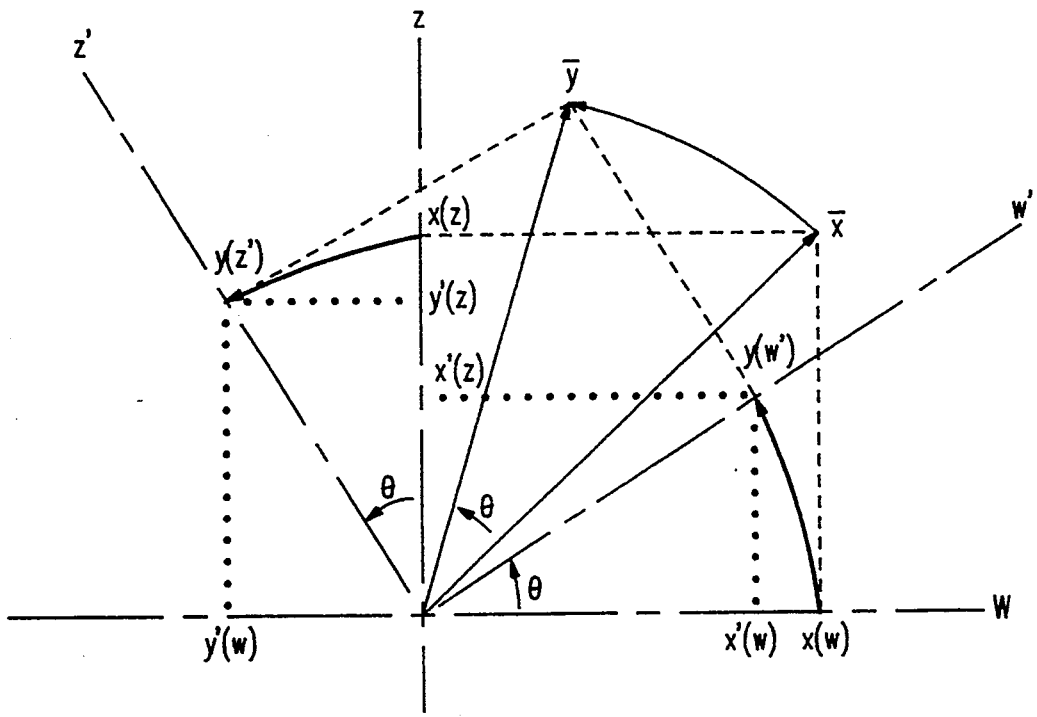

TRANSFORM R TAKES VECTOR $\bar{x}$ INTO VECTOR $\bar{y}$      $R: \bar{x} \rightarrow \bar{y}$ WITH RESPECT TO ARBITRARY BASIS w AND z $$\bar{x} = \begin{pmatrix} x(w) \\ x(z) \end{pmatrix} = \begin{pmatrix} x(w) \\ 0 \end{pmatrix} + \begin{pmatrix} 0 \\ x(z) \end{pmatrix} \; ; \; \|\bar{x}\| = [x^2(w) + x^2(z)]^{1/2}$$

R TAKES w INTO w' AND z INTO z'

THUS    $R: x(w) \rightarrow y(w') = \begin{pmatrix} x'(w) \\ x'(z) \end{pmatrix} \; ; \; R: x(z) \rightarrow y(z') = \begin{pmatrix} y'(w) \\ y'(z) \end{pmatrix}$ WHERE    $x'(w) = x(w)\cos\theta, \; x'(z) = x(w)\sin\theta,$
             $y'(w) = -x(z)\sin\theta, \; y'(z) = x(z)\cos\theta.$ $$\bar{y} = \begin{pmatrix} y(w') \\ y(z') \end{pmatrix} = \begin{pmatrix} y(w') \\ 0 \end{pmatrix} + \begin{pmatrix} 0 \\ y(z') \end{pmatrix} = \begin{pmatrix} x'(w) \\ x'(z) \end{pmatrix} + \begin{pmatrix} y'(w) \\ y'(z) \end{pmatrix} = \begin{pmatrix} x(w)\cos\theta - x(z)\sin\theta \\ x(w)\sin\theta + x(z)\cos\theta \end{pmatrix}$$

$$= \begin{pmatrix} \cos\theta & -\sin\theta \\ \sin\theta & \cos\theta \end{pmatrix} \begin{pmatrix} x(w) \\ x(z) \end{pmatrix} \; ; \; \|\bar{y}\| = [(x^2(w)+x^2(z))(\cos^2\theta+\sin^2\theta)]^{1/2}$$

$$= [x^2(w) + x^2(z)]^{1/2} = \|\bar{x}\|$$

FIG. 1

GIVEN $\bar{x} = \begin{pmatrix} x(0) \\ x(1) \end{pmatrix}$ , NOTHING $\|\bar{x}\| = \sqrt{x^2(0) + x^2(1)}$ , DEFINE $C = \dfrac{x(0)}{\sqrt{x^2(0)+x^2(1)}}$ , $S = \dfrac{x(1)}{\sqrt{x^2(0)+x^2(1)}}$ , FORM $R = \begin{pmatrix} C & S \\ -S & C \end{pmatrix}$ AND OBSERVE $\begin{aligned} S &= \sin\theta \\ C &= \cos\theta \end{aligned}$ ;

THEN $\bar{y} = R\bar{x} = \begin{pmatrix} C & S \\ -S & C \end{pmatrix} \begin{pmatrix} x(0) \\ x(1) \end{pmatrix} = \begin{pmatrix} \dfrac{x^2(0)+x^2(1)}{\sqrt{x^2(0)+x^2(1)}} \\ \dfrac{-x(1)x(0)+x(0)x(1)}{\sqrt{x^2(0)+x^2(1)}} \end{pmatrix} = \begin{pmatrix} \sqrt{x^2(0)+x^2(1)} \\ 0 \end{pmatrix}$ GENERALIZED TO i-j PLANE AS

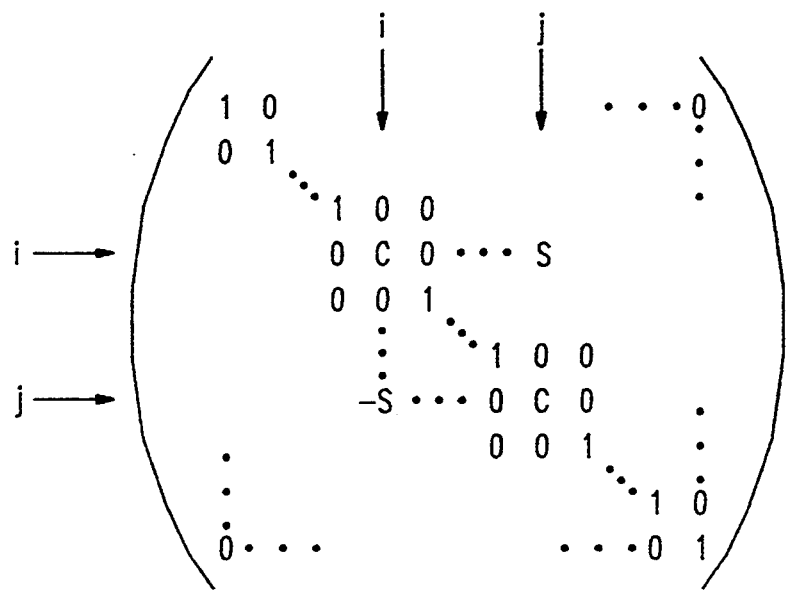

FIG. 2

$$S_{vu} = \frac{1}{4} C_u C_v \sum_{x=0}^{7} \sum_{y=0}^{7} S_{yx} \cos\left[\frac{(2x+1)u\pi}{16}\right] \cos\left[\frac{(2y+1)v\pi}{16}\right] \; ; \; \begin{matrix} C_u, C_v = \frac{1}{\sqrt{2}} & u,v = 0 \\ C_u, C_v = 1 & u,v \neq 0 \end{matrix}$$

$$S_{vu} = \frac{1}{4} R_{vy} S_{yx} L_{xu}$$

$$[S_{vu}] = \frac{1}{4} \begin{bmatrix} \frac{1}{\sqrt{2}} & - & - & - & \frac{1}{\sqrt{2}} \\ - & & & & - \\ - & & \cos\left[\frac{(2y+1)v\pi}{16}\right] & & - \\ - & & & & - \\ \cos\left[\frac{7\pi}{16}\right] & - & - & - & \cos\left[\frac{105\pi}{16}\right] \end{bmatrix} \begin{bmatrix} S_{00} & - & - & S_{07} \\ - & & & - \\ S_{y0} & - & S_{yx} & - & S_{y7} \\ - & & & - \\ S_{70} & - & - & S_{77} \end{bmatrix} \begin{bmatrix} \frac{1}{\sqrt{2}} & - & - & - & \cos\left[\frac{7\pi}{16}\right] \\ - & & & & - \\ - & & \cos\left[\frac{(2x+1)u\pi}{16}\right] & & - \\ - & & & & - \\ \frac{1}{\sqrt{2}} & - & - & - & \cos\left[\frac{105\pi}{16}\right] \end{bmatrix}$$

FIG. 3

$$\begin{bmatrix} y0 \\ y1 \\ y2 \\ y3 \end{bmatrix} = \sqrt{\frac{2}{N}} \begin{bmatrix} \frac{1}{\sqrt{2}} & \frac{1}{\sqrt{2}} & \frac{1}{\sqrt{2}} & \frac{1}{\sqrt{2}} \\ c_8^1 & c_8^3 & -c_8^3 & -c_8^1 \\ c_8^2 & -c_8^2 & -c_8^2 & c_8^2 \\ c_8^3 & -c_8^1 & c_8^1 & -c_8^3 \end{bmatrix} \begin{bmatrix} x0 \\ x1 \\ x2 \\ x3 \end{bmatrix}$$

$$= \frac{1}{\sqrt{2}} \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} \frac{1}{\sqrt{2}} & \frac{1}{\sqrt{2}} & 0 & 0 \\ c_8^2 & -c_8^2 & 0 & 0 \\ 0 & 0 & c_8^3 & c_8^1 \\ 0 & 0 & -c_8^1 & c_8^3 \end{bmatrix} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} x0 \\ x1 \\ x2 \\ x3 \end{bmatrix}$$

WHERE $c_{2N}^k = \cos[k\pi/(2N)]$, $N = 4$, AND $\frac{1}{\sqrt{2}} = \sqrt{\frac{2}{N}} \cdot \frac{1}{\sqrt{2}}$, AND LETTING $\bar{c}_{2N}^k = \left(\frac{1}{\sqrt{2}}\right) \cos[k\pi/(2N)]$ HAVE BY CARRYING $\frac{1}{\sqrt{2}}$ INTO THE MATRIX, NOTHING $c_8^2 = \frac{1}{\sqrt{2}}$ $$\begin{bmatrix} y0 \\ y1 \\ y2 \\ y3 \end{bmatrix} = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} \frac{1}{2} & \frac{1}{2} & 0 & 0 \\ \frac{1}{2} & -\frac{1}{2} & 0 & 0 \\ 0 & 0 & \bar{c}_8^3 & \bar{c}_8^1 \\ 0 & 0 & -\bar{c}_8^1 & \bar{c}_8^3 \end{bmatrix} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} x0 \\ x1 \\ x2 \\ x3 \end{bmatrix}$$

FIG. 4

BELOW $R_k$ REFERS TO REGISTER (STORAGE MEANS LOCATION) "k", $\overline{C}_{2N}^k = \frac{1}{\sqrt{2}} \cos[k\pi/(2N)]$ $y1 \longrightarrow \left\{\begin{array}{l}\text{MULTIPLY OR}\\ \text{TABLE LOOK-UP}\end{array}\right.$
$R_1 = y1\overline{C}_8^1, y1\overline{C}_8^3;$ $y3 \longrightarrow \left\{\begin{array}{l}\text{MULTIPLY OR}\\ \text{TABLE LOOK-UP}\end{array}\right.$
$R_2 = y3\overline{C}_8^3, -y3\overline{C}_8^1;$ $R_3 = R_1 + R_2 = y1\overline{C}_8^1 + y3\overline{C}_8^3, y1\overline{C}_8^3 - y3\overline{C}_8^1;$ $y0 \longrightarrow \left\{\begin{array}{l}\text{MULTIPLY OR}\\ \text{TABLE LOOK-UP}\end{array}\right.$
$R_4 = \frac{1}{2}y0, \frac{1}{2}y0;$ $y2 \longrightarrow \left\{\begin{array}{l}\text{MULTIPLY OR}\\ \text{TABLE LOOK-UP}\end{array}\right.$
$R_5 = y2\overline{C}_8^2, -y2\overline{C}_8^2;$ $R_6 = R_4 + R_5 = \frac{1}{2}y0 + y2\overline{C}_8^2, \frac{1}{2}y0 - y2\overline{C}_8^2;$ $R_7 = R_3 + R_6 = \underbrace{\frac{1}{2}y0 + y1\overline{C}_8^1 + y2\overline{C}_8^2 + y3\overline{C}_8^3}_{\text{(UPPER) THIS PART IS x0}}, \underbrace{\frac{1}{2}y0 + y1\overline{C}_8^3 - y2\overline{C}_8^2 - y3\overline{C}_8^1}_{\text{(LOWER) THIS PART IS x1}};$ $R_8 = R_6 - R_3 = \underbrace{\frac{1}{2}y0 - y1\overline{C}_8^1 + y2\overline{C}_8^2 - y3\overline{C}_8^3}_{\text{(UPPER) THIS PART IS x3}}, \underbrace{\frac{1}{2}y0 - y1\overline{C}_8^3 - y2\overline{C}_8^2 + y3\overline{C}_8^1}_{\text{(LOWER) THIS PART IS x2}};$

FIG. 6

| y1 | $y1\,\overline{c}_8^1$ , $y1\,\overline{c}_8^3$ | | $y1\,\overline{c}_8^1$ , $y1\,\overline{c}_8^3$ | |
|---|---|---|---|---|
| DECIMAL | REGISTER PARTS IN DECIMAL (VALUES TRUNCATED TO 3 PLACES) | | REGISTER PARTS IN BINARY (TWO'S COMPLIMENT) (VALUES AS 8-BIT APPROXIMATIONS) | |
| ..8 | 5.226 | 2.165 | 101.0 | 10.0 |
| 9 | 5.880 | 2.435 | 110.0 | 10.1 |
| 10 | 6.533 | 2.706 | 110.1 | 10.1 |
| 11 | 7.186 | 2.977 | 111.0 | 11.0 |
| 12.. | 7.839 | 3.247 | 1000.0 | 11.0 |

| y3 | $-y3\,\overline{c}_8^3$ , $-y3\,\overline{c}_8^1$ | | $-y3\,\overline{c}_8^3$ , $-y3\,\overline{c}_8^1$ | |
|---|---|---|---|---|
| DECIMAL | REGISTER PARTS IN DECIMAL (VALUES TRUNCATED TO 3 PLACES) | | REGISTER PARTS IN BINARY (TWO'S COMPLIMENT) (VALUES AS 8-BIT APPROXIMATIONS) | |
| ..17 | −11.106 | 4.600 | 100.1 | 1110101.0 |
| 18 | −11.759 | 4.871 | 101.0 | 1110100.0 |
| 19 | −12.412 | 5.141 | 101.0 | 1110011.1 |
| 20 | −13.066 | 5.412 | 101.1 | 1110011.0 |
| 21.. | −13.720 | 5.683 | 110.0 | 1110001.1 |

NOTE $\overline{c}_8^2 = \frac{1}{\sqrt{2}} \cos[2\pi/8] = \frac{1}{2}$ AND $-\overline{c}_8^2 = -\frac{1}{2}$

FIG. 7

STARTING COEFFICIENTS [y0, y1, y2, y3,]=[26, 10, 13, 19]
RESULTING DATA SAMPLES [x0, x1, x2, x3]=[31, −4, 8, 17]

$\|(y_j)\| = 36.14 \simeq \|(x_j)\| = 36.47$

| REGISTER | TRUNCATED DECIMAL VALUE OF PARTS | | 16-BIT REGISTER AS 8-BIT PAIR, BINARY (TWO'S COMPLIMENT) CALCULATION OF PARTS | |
|---|---|---|---|---|
| | UPPER | LOWER | UPPER | LOWER |
| $R_1$ | 6.533 | 2.706 | 0000110.10 | 0000010.1 |
| | {ACTUAL CARRY OF 16-BIT} | | | {BUFFER SPACE ALLOCATION} |
| $R_2$ | 5.141 | −12.412 | 0000101.00 | 1110011.1 |
| $R_3$ | 11.674 | −9.706 | 0001011.10 | 1110110.0 |
| $R_4$ | 13.000 | 13.000 | 0001101.00 | 0001101.0 |
| $R_5$ | 6.500 | −6.500 | 0000110.10 | 1111001.1 |
| $R_6$ | 19.500 | 6.500 | 0010011.11 | 0000110.1 |
| | | | | {TWO'S COMPLIMENT ADDITIONAL SPILLS OVER INTO BUFFER} |
| $R_7$ | 31.174 | −3.206 | 0011111.01 (x0) | 1111100.1 (x1) |
| $R_8$ | 7.826 | 16.206 | 0001000.00 (x3) | 0010000.1 (x2) |

{EARLIER OVERFLOW IS "BORROWED" BACK BY SUBTRACTION OF $R_3$}

ROUNDING RULES AND METHODS ARE APPLICATION DEPENDENT, FOR THIS EXAMPLE MIGHT CHOOSE TO ROUND AWAY FROM ZERO YIELDING x0=31, x1=−4, x2=17, x3=8.

FAST INVERSE DISCRETE TRANSFORM USING SUBWORDS FOR DECOMPRESSION OF INFORMATION

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

The present invention relates to software techniques for speeding up the computation of transforms and, more particularly, to a method for causing a general purpose computer to emulate a parallel processor on an intermittent basis.

BACKGROUND ART

Most all technological undertakings can be understood and brought to fruition through mathematical analysis. Mathematical formulations and models of problems are used both to predict the outcome of an action and to infer the cause of an observation. Transform methods are often used to reduce the apparent complexity of these mathematical problems, and to take advantage of desirable properties of the restated problem. Everyday examples of very simple transformations include: converting from temperature measurement in degrees Fahrenheit to degrees Centigrade; and changing the description of a large circular groove, from center location and radius, to a chain of (x,y) coordinates so that a milling machine might be used to cut the groove.

Descriptions of complex systems (in fields as diverse as engineering, chemistry, biology, physiology, and economics) tend to give rise to differential equations, which in turn are often advantageously approached through the use of integral transforms. The more well-known integral transforms include the Fourier, Sine, Cosine, Laplace, Hankel, Hilbert, and Abel transforms. The Fourier Transform, for example, has the useful property of turning a convolution in the original function space into a multiplication in the transform domain: thus the behavior of an audio amplifier in response to an input signal, is more readily understood as the product of the signal spectrum and the amplifier frequency response (the transform of its time response), instead of the time convolution of the signal and amplifier transfer function.

Many data handling applications of commercial interest involve performing discrete transforms upon time dependent sequences of values at real-time rates. It is essential that the computation for an N-point transform be completed in less time than passes in the accumulation of another N-point collection of data. The decompression of transform-encoded video data streams, and the compression and decompression of audio signals are two prominent examples of applications wherein speed of transform computation has been of primary concern to designers. The general assumption of practitioners in the field has been that specialized, dedicated-function, electronic hardware must be utilized in such applications. Although it is well recognized that very high performance general computing platforms might provide the requisite speed, the high cost of such platforms prohibits the general utility of such an approach. Consequently, considerable effort has been expended on the reduction of hardware complexity.

U.S. Pat. No. 4,760,543 to Ligtenberg et al. is one such hardware implementation of a Discrete Cosine Transform (DCT hereinafter) with emphasis placed on the general simplification of the computations. U.S. Pat. No. 4,912,668 to Aubie et al. utilizes the regularity of the DCT algorithm disclosed by B. G. Lee in his paper entitled "A New Algorithm for the Discrete Cosine Transform", IEEE Transactions on Acoustics, Speech and Signal Processing, Vol. ASSP-32, pp. 1243–1245, Dec. 1984, in a direct hardware implementation of the calculations, to minimize the number of multipliers required.

U.S. Pat. No. 4,837,724 to Borgers et al. is an implementation derived from the DCT algorithms of W. Wang, and N. Suehiro and M. Hatori, with the higher complexity butterfly chains restated as sums of quadruples, thereby ensuring that no transform coefficient computation contained any chained multiplications. See the paper by N. Suehiro and M. Hatori entitled "Fast Algorithms for the DFT and Other Sinusoidal Transforms", IEEE Transactions on Acoustics, Speech and Signal Processing, Vol. ASSP-34, pp 642–644, June 1986. U.S. Pat. No. 4,831,574 to Duhamel essentially implements the B. G. Lee algorithm (1984), similar to Borgers, et al. but handles the required multiplications as serial arithmetic so as to avoid the explicit use of multipliers.

U.S. Pat. No. 4,849,922, to Riolfo performs a direct (forward only) DCT computation, wherein restriction to transform coefficient resolution of 8-bits, makes it possible to effect data multiplication using simple shifts and adds of the data values when forming the partial products of the transform. U.S. Pat. No. 4,449,194 to Wilhelm approximates the transform coefficients with 3-bit resolution to allow very simple shift and add implementation of a dedicated eight-point by eight-point DCT. U.S. Pat. No. 4,829,465 to Knauer et al. uses a scrambling of the input and output vectors (see the paper of B. G. Lee entitled "Input and Output Index Mappings for a Prime-Factor-Decomposed Computation of Discrete Cosine Transform", IEEE Transactions on Acoustics, Speech and Signal Processing, Vol. ASSP-37, pp. 237–244, Feb. 1989) to arrive at a transform matrix with symmetries which minimize the number of table entries which must be used for a table look-up approach to multiplication.

Accordingly, there is a need for a method whereby a general purpose computing device, such as comprises the central processing unit of common, small scale (so-called personal, portable, desktop, and so forth), computers, can perform discrete transform computations with adequate speed, so as to obviate the need for specialized electronic hardware, for many time-critical transform applications. One specific example of such a need is in connection with the real-time presentation of video image sequences which are retrieved in compressed form from a digital storage medium or a network communication medium.

DISCLOSURE OF INVENTION

All common "fast transform" implementations of various discrete transform types depend upon establishing a sparse matrix decomposition of the transform. It is the presence of mostly zeroes in the matrix which substantially reduces the total number of computations which must be performed in calculating the transform. These sparse matrix forms are, in turn, often illustrated with signal flow graphs. See, for example, the paper by W-H Chen, C. H. Smith, and S. C. Fralick entitled "A Fast Computational Algorithm for the Discrete Cosine Transform", IEEE Transactions on Communications, Vol. COM-25, No. 9, pp. 1004–1009, Sept. 1977. That paper contains both notational devices. Several formulations of the Cooley/Tukey fast algorithm for computing a Discrete Fourier Transform (so-called FFT) also utilize these lattice type signal flow graphs. See the paper by J. W. Cooley and J. W. Tukey entitled "An Algorithm for the Machine Computation of Complex Fourier Series", Mathematics of Computation, Vol. 19, pp. 297–301, April 1965. It is to be noted that the present invention is useful to the numerical implementation of all transforms which are admissible to a regular, lattice type, signal flow graph, including those in which the repeating structure consists of triads, or similar, instead of the common two-element by two-element butterfly.

The method derives from treating an integer (not floating point) processor whole word as being the concatenation of "S" smaller integer subwords. Additions and subtractions of whole words will simultaneously result in additions and subtractions amongst all "S" corresponding subwords. When the range of values which may occur in the subwords is suitably limited, by the specific properties of the particular mathematical problem being solved, the subwords will be mutually exclusive or arithmetically orthogonal. This is to say, a given subword will never have excursions of value which disturb either nearest neighbor, neither carries nor borrows will propagate to adjacent subwords. In many commercially interesting applications of integral transforms, the range of resulting transform coefficient values is specifically limited due to resolution limits of the initial data sequences. Consequently, for suitably wide processor whole words, it is possible to carefully partition whole words into "S" subwords in a manner such that summations, of transform partial products forming "S" transform results, occur simultaneously. This method reduces the number of instructions which must be performed by about (1/S); thus for S=2, a transform implementation will be executed in about one half the time otherwise required.

Most general purpose processors lack extensive sets of instructions for manipulating partial words. Consequently, one preferred embodiment of the present invention achieves the coefficient multiplications needed for the subword method, by precomputing tables of whole word values; then using the starting sequence values as indexes into the table, the required whole word values are found as concatenated subwords by table look-up. This table look-up approach avoids several problems: the alternative direct multiplication of whole words does not preserve the integrity of subwords, loading multiplied values into corresponding subwords may be difficult depending upon the available partial-word instructions, and some general purpose processors may not have high speed multiplication facilities.

BRIEF DESCRIPTION OF DRAWINGS

For a fuller understanding of the present invention, reference is made to the accompanying drawings taken in conjunction with the following detailed description of the best mode of carrying out the invention. In the drawing:

FIG. 1 shows derivation of two-point unitary transform as a plane rotation.

FIG. 2 shows generalized plane rotation for introduction of zeroes into a matrix.

FIG. 3 shows separable decomposition of 2-d $8 \times 8$ DCT into product of two 1-d DCTs.

FIG. 4 shows sparse matrix for a four-point FDCT.

FIGS. 5, 6, 7 and 8, taken together, form a pedagogical example of using the invention in forming a four-point inverse DCT.

FIG. 5 illustrates typical signal flow graph "butterfly" structure and corresponding signal flow graph for a four-point IDCT.

FIG. 6 shows algebraic symbology of IDCT process for the example.

FIG. 7 shows a partial look-up table for the example.

FIG. 8 shows a specific numerical example.

The same reference characters are used to refer to the same elements of the present invention throughout the several figures of the drawing.

BEST MODE OF CARRYING OUT THE INVENTION

Figure 5:
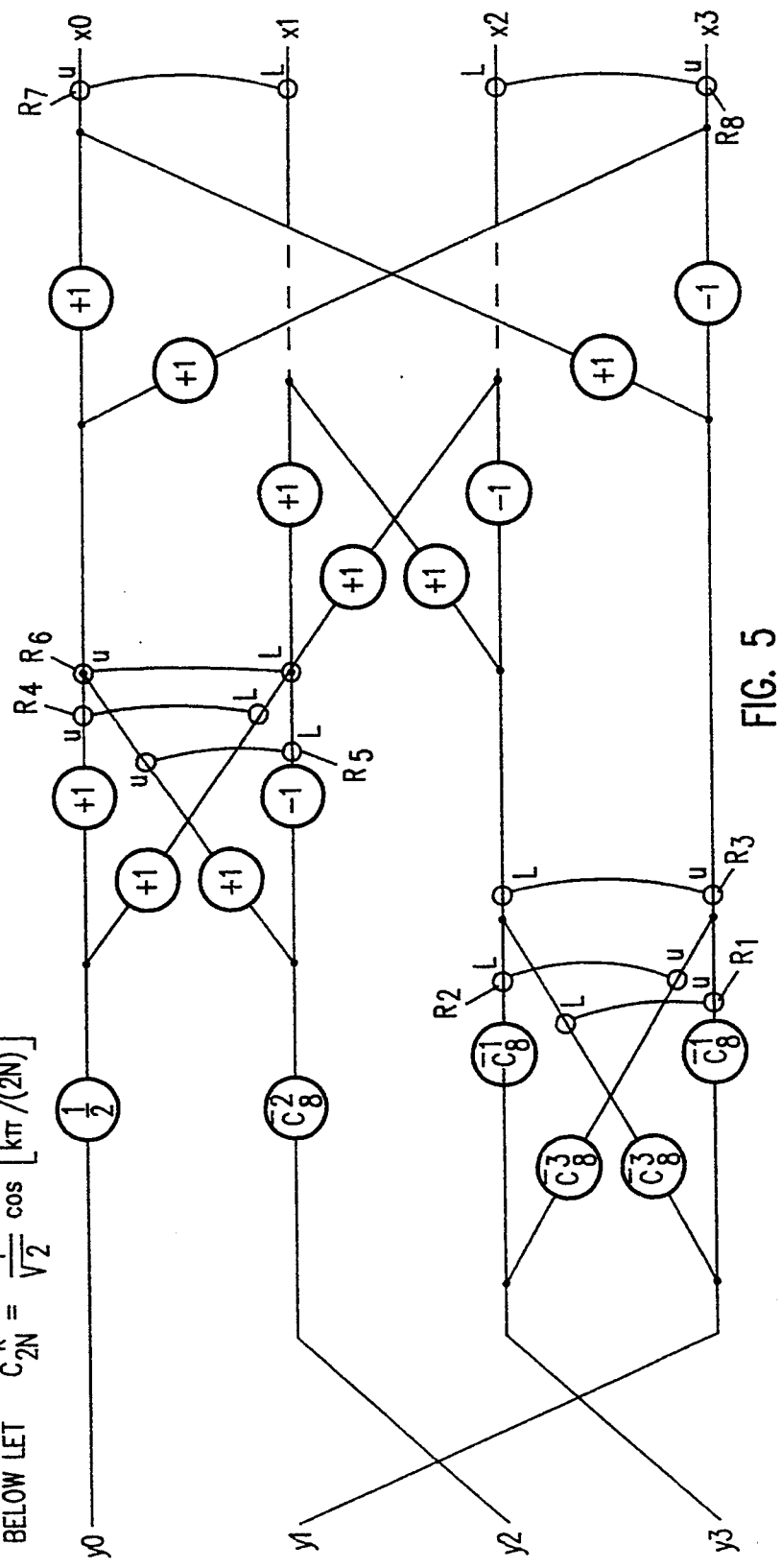

Most, but not all, transforms have an inverse formulation from which the original function may be recovered from the transform. Two examples of interest in many signal processing applications are:

forward Fourier transform F(s) of a function f(x)

$$F(s) = \sqrt{\frac{1}{2\pi}} \int_{-\infty}^{+\infty} f(x) \exp(-i \, x \, s) \, dx$$

inverse Fourier transform from F(s) to the function f(x)

$$f(x) = \sqrt{\frac{1}{2\pi}} \int_{-\infty}^{+\infty} F(s) \exp(+i \, x \, s) \, ds$$

forward Cosine transform F(u) of a function f(y)

$$F(u) = \sqrt{\frac{2}{\pi}} \int_{0}^{\infty} f(y) \cos(2\pi \, u \, y) \, dy$$

inverse Cosine transform from F(u) to the function f(y)

$$f(y) = \sqrt{\frac{2}{\pi}} \int_{0}^{\infty} F(u) \cos(2\pi \, u \, y) \, du$$

The use of digital electronic computing devices and digital measurement systems inherently requires handling collections of discrete values which are representative of continuous functions. When a collection of values is associated with only one independent variable, the numbers representing the data values are said to be one-dimensional; for example, a record of temperature in a room at one minute intervals is a one-dimensional sequence. An example of two-dimensional data is the intensity of light recorded in an image as a function of up/down and left/right location. Discrete transform methods have been developed for working with such number sequences. Well known examples include the Karhunen-Loeve Transform, the Discrete Fourier Transform (made popular by the algorithm of Cooley and Tukey), the Discrete Cosine Transform (discovered by Ahmed, Natarajan, and Rao), the Walsh-Hadamard Transform, the Discrete Hartley transform, and the Z-Transform. The one-dimensional defining equations for the discrete versions of the two previously shown transforms for a data sequence of N values are as follows:

forward discrete Fourier transform F(v) of the function f(n)

$$F(v) = \sqrt{\frac{1}{N}} \sum_{n=0}^{N-1} f(n) \exp(-i \, 2\pi \, v \, n / N)$$

inverse discrete Fourier transform from F(v) to the function f(n)

$$f(n) = \sqrt{\frac{1}{N}} \sum_{v=0}^{N-1} F(v) \exp(+i \, 2\pi \, v \, n / N)$$

forward discrete Cosine transform F(k) of a function f(j)

$$F(k) = \sqrt{\frac{2}{N}} \sum_{j=0}^{N-1} f(j) \cos[((2j+1) k\pi)/(2N)]$$

inverse discrete Cosine transform from F(k) to the function f(j)

$$f(j) = \sqrt{\frac{2}{N}} \sum_{k=0}^{N-1} F(k) \cos[((2j+1) k\pi)/(2N)]$$

For ease of notation, and generality of results, discussions of one-dimensional data sequences often recognize that a sequence of N values may be described as an N-dimensional vector. Thus the linear transformation T, which takes the sequence x(0), x(1), . . . , x(N−2), x(N−1) into the transform sequence Y(0), Y(1), . . . , Y(N−2), Y(N−1), is represented as follows:

$$Y(\ldots) = T x(\ldots) \text{ where } Y(k) = \sum_{j=0}^{N-1} t(k,j) \, x(j)$$

or as a matrix and vectors $$\begin{bmatrix} Y(0) \\ Y(1) \\ \ldots \\ Y(N-2) \\ Y(N-1) \end{bmatrix} =$$

$$\begin{bmatrix} t(0,0) & t(0,1) \ldots t(0,N-2) & (t(0,N-1) \\ t(1,0) & & t(1,N-1) \\ \ldots & & \ldots \\ t(N-2,0) & \ldots & t(N-2,N-1) \\ t(N-1,0) & \ldots & t(N-1,N-1) \end{bmatrix} \begin{bmatrix} x(0) \\ x(1) \\ \ldots \\ x(N-2) \\ x(N-1) \end{bmatrix}$$

The well developed theory of linear transformations on vector spaces may be utilized to enhance understanding of discrete transform processes. Given two vector spaces defined over some field of numbers, the set of all linear transformations between those vectors spaces is itself a vector space, over that same field (see Cullen for instance: Matrices and Linear Transformation, Palo Alto, Addison-Wesley Publishing Co., C 1966). Abstractly, this leads to the theorem that two N-dimensional matrices A and B are similar (a special defined terminology, meaning that there exists a nonsingular matrix S such that $B=S^{-1}A\,S$, where $S^{-1}S=I$), if and only if A and B represent the same linear operator relative to different bases of the vector space. This ability to select an orthogonal basis for the transform T, with an eye toward particular properties, can be used to great benefit. In particular, the Discrete Cosine Transform (DCT) is developed by Rao and Yip [K. R. Rao and P. Yip, Discrete Cosine Transform-Algorithms, Advantages, Applications, San Diego, Calif.: Academic Press, C 1990] using Gaussian quadrature on the Tchebyshev polynomials. Tchebyshev polynomials define the interpolation points for minimizing the error of an N−1 degree polynomial over N points (see Apostol, also Southworth). [T. M. Apostol, Calculus Vol. II New York: Blaisdell Pub. Co., C 1962; R. W. Southworh, and S. L. DeLeeuw, Digital Computation and Numerical Methods, New York: McGraw-Hill Book Co., C 1965] This error minimization is (intuitively) why the DCT gives results which are very close to the statistically optimal Karhunen-Loeve transform, without the need to have a-priori knowledge of the data sequence statistics. The DCT has been found in practice to be a very efficient method for analyzing images to allow transform coding type image compression.

The Discrete Cosine Transform and the Discrete Fourier Transform belong to the class of linear transforms referred to as unitary. Two properties of unitary matrices (transforms) which are important to discrete transforms, are their preservation of Euclidean length, and the adjoint of a unitary matrix is its inverse. The adjoint U* of matrix U, is the complex conjugate of its transpose $U^T$, thus:

If U is unitary, with U having elements $u[j,k]=[a(j,k)+i\,b(j,k)]$ where $i\times i = -1$, then $U^* = (\ldots [a(k,j)-i\,b(k,j)]\ldots)$ and $U^*U = I$; with Euclidean unchanged length $\|\_\|$ of vector z, where $z=(\ldots, x[j]+i\,y[j], \ldots)$, given as $$\|z\| = (x^*x)^{\frac{1}{2}} = \left(\sum_{j=0}^{N-1} x^2(j) + y^2(j)\right)^{\frac{1}{2}} = \|Uz\|.$$

This says explicitly that if F(k) is the N-point DCT of a sequence f(j) formed by matrix U as F=U f, then f=U* F and $\|f\| = \|F\|$.

Referring now to the drawings, FIG. 1 shows derivation of two-point unitary transform as a plane rotation. The transform R takes the 2-dimensional vector X into the 2-dimensional vector Y by rotating it through the angle Theta. An arbitrary orthogonal basis consisting of W and Z is selected for the vector space (plane), and X is seen to be expressed on this basis as having components X(W) and X(Z). The transformation R will also rotate the basis W and Z through angle Theta to form another orthogonal basis consisting of W' and Z'. It can be seen that the new vector Y can be expressed on the new basis W' and Z' as having components Y(W') and Y(Z'), in a manner similar to that for X on the original basis. The length of Y is the same as the length of X, in the same manner as the length of X(W) is the same as the length of Y(W') and the length of X(Z) the same as the length of Y(Z'). The new vector components, expressed on the new basis, can in turn be individually expressed on the old basis as Y(W')=X'(W)+X'(Z) and Y(Z')=Y'(W)+Y'(Z). In particular, X'(W)=cosθX(W) and X'(Z)=sinθX(W), while Y'(W)=−sinθX(Z) and Y'(Z)=cosθX(Z). Thus, for the case N=2, the derivation of FIG. 1 demonstrates how rotations in a plane are unitary, and in fact for Real coefficients (not complex/imaginary numbers) every N=2 unitary transform is of the form $$T = \begin{bmatrix} \cos(\theta) & \sin(\theta) \\ \sin(\theta) & -\cos(\theta) \end{bmatrix} \text{or } T = \begin{bmatrix} \cos(\theta) & -\sin(\theta) \\ \sin(\theta) & \cos(\theta) \end{bmatrix}$$

FIG. 2 shows generalized plane rotation for introduction of zeroes into a matrix. The QR algorithm for reducing a matrix to triangular or quasi-triangular form by orthogonal similarity transformations (often used for solving least squares optimization problems), is based upon using generalized plane rotations to introduce zeroes into a matrix (see in particular Stewart: G. W. Stewart, Introduction to Matrix Computations, New York, Academic Press, C 1973), as shown in the derivation of FIG. 2. This method of decomposing the unitary matrix of an orthogonal transformation, into the product of a collection of rotations, forms the basis for the patent of Ligtenberg and O'Neill covering one embodiment of an Orthogonal Transform Processor.

These orthogonal transforms have the additional property of being separable, which is to say the transform may be computed in multiple dimensions, for multidimensional data sequences, by treating each data dimension sequentially, thus:

With two-dimensional data values having indices a and b forming array f(a,b)

if F(j,k)=T(j,k) f(a,b), then one can formulate T*(j,a) and T(b,k)

such that F(j,k)=T*(j,a) f(a,b) T(b,k).

Referring now to FIG. 3, this separability property is illustrated explicitly for the case of an eight-point by eight-point Discrete Cosine Transform (8×8 DCT), which is found in many video and still image compression applications. Rao shows that it is also possible to formulate the two-dimensional DCT such that the data array is treated as one long sequence, formed by concatenating the data array columns, operated on by one transform matrix of extended width. The resulting two-dimensional array of transform coefficients is the Kronecker, or direct, product of the separable parts discussed above; while not merely an overly long one-dimensional DCT (the actual coefficients are different), it is still amenable to the treatments discussed in connection with the present invention.

The preservation of length property, previously noted for unitary transforms, has the useful consequence that an N-point transform applied to data which has been limited to a maximum value M, will yield transform coefficients which are never greater than MN. The patent of Aubie et al. explores the methods and consequences of performing transform calculations with a fixed data resolution. R. J. Clarke (R. J. Clarke, "On the Dynamic Range of Coefficients Generated in Transform Processing of Digitised Image Data," IEE Proceedings, Vol. 132, Part F, PP. 107-110, April 1985) shows the dynamic range of values encountered with transform methods is approximately the product of the data's dynamic range, times the greatest dynamic range amongst the transform matrix values, times the number of points in the transform. However, many numerically lossy image and audio data compression algorithms explicitly limit the dynamic range or resolution of the transform domain coefficients as well as the initial raw data. For clarity and ease of understanding, without loss of generality, the expository example used for the balance of this discussion will be the Discrete Cosine Transform of a sequence containing only four values (N=4). In this example the transform coefficients are assumed to be limited to a 7-bit range (−63<=Y[-]<=63) corresponding to a 6-bit range for original and reconstructed data (−31<=X[]<=31).

FIG. 4 shows a sparse matrix decomposition for forming a four-point Forward Direct Cosine Transform (FDCT). Given precomputed coefficients for the basic 4×4 matrix of the FDCT, the direct calculation of the transform would require twenty multiplications (four of which are the final scaling by the scalar 1√2) and twelve additions. The three sparse matrices applied in sequence will accomplish the same calculation with twelve multiplications and eight additions, because the apparent calculations corresponding to the entries of value zero require no action at all. Inclusion of the scalar value in the nonzero entries of the middle matrix will further reduce the calculations to eight multiplications and eight additions.

A signal flow graph corresponding to a four-point Inverse Discrete Cosine Transform (IDCT) is shown in FIG. 5, along with an explanation of the typical "butterfly" notation. This particular transform decomposition is amenable to the wide word method of the invention. The signal flow graph corresponds to a sparse matrix decomposition of the IDCT, wherein the leading scalar coefficient has been included in the matrix entry values, to minimize the number of multiplications. Branches of the signal flow graph which correspond to upper (shown as U) and lower (shown as L) subword portions of whole words containing transform partial products are indicated as R1 through R8. The four starting transform coefficients, Y0, Y1, Y2, and Y3, are used to create transform partial products (either by actual multiplication or table look-up methods, for example), which are placed in related subword portions of four whole word storage means locations. Thus Y1 (for example) is used to form $$n\overline{c_8^3} = n\left(\frac{1}{\sqrt{2}}\right)c_8^3 = n\left(\frac{1}{\sqrt{2}}\right)\cos(3\pi/16)$$

which is placed in the lower portion of R1 and $$n\overline{c_8^1} = n\left(\frac{1}{\sqrt{2}}\right)c_8^1 = n\left(\frac{1}{\sqrt{2}}\right)\cos(\pi/16)$$

which is placed in the upper portion of R1. The entire IDCT can subsequently be completed by performing three additions and one subtraction (i.e. four additions total). This is to be contrasted with the eight multiplications and eight additions for the usual sparse matrix formulation without use of the subword invention. FIG. 6 illustrates with symbolic variables the entire process used to compute the four-point Inverse Discrete Cosine Transform using the invention.

Clearly, the net gain in computational efficiency is dependent upon the means by which the transform partial product values are introduced to the subword portions of the whole word storage means locations. As is known to those skilled in the art, the precise embodiment chosen will be peculiar to the specific digital electronic apparatus which it is desired to have utilize the invention. One embodiment, which is especially suited to apparatus with highly efficient information manipulation means facilitating indexing and data transfer amongst storage means locations, involves the prior computation of all possible subword values. Said values are then grouped in the desired whole word relationships and assembled as entries in a table of whole words, wherein the transform starting values form the index into the table. Thus in the preceding example, Y1 forms the index into a table of whole words, where the location pointed to by the index contains a whole word value consisting of the two desired subwords, namely $$n\overline{c_8^1}$$

in the lower portion and $$n\overline{c_8^3}$$

in the upper portion. The entire whole word value is thereby retrieved and placed in the computational portion of the digital electronic apparatus. For the example four-point computation above, FIG. 7 provides a portion of the table which would be used for such a look-up embodiment of the initial subword assemblage, while FIG. 8 provides a specific numerical case from this example which illustrates the behavior of the information within the computational registers.

An especially useful application of the invention is that of an 8-point IDCT, formulated so as to be used repeatedly in the computation of the two-dimensional inverse Discrete Cosine Transform, for a 64-point array of image intensity values as follows. In several standardized image compression/decompression methods, the starting image intensity samples (pixels) have a resolution of one part in 256 (i.e. 8-bits). In such standardized methods, a two-dimensional 8-point by 8-point forward Discrete Cosine Transform is applied to 64-point rectangular subsets of the intensity values, and the resulting transform coefficients are explicitly limited to a resolution of one part in 2048 (typically taking on values in the range of −1023 through +1023, represented as two's complement integers comprising 10-bits plus sign). The resulting array of sixty-four coefficients is frequently scaled, truncated, and otherwise reduced in complexity; and then lastly, entropy coding type data compression is applied to the coefficients.

Figure 9:
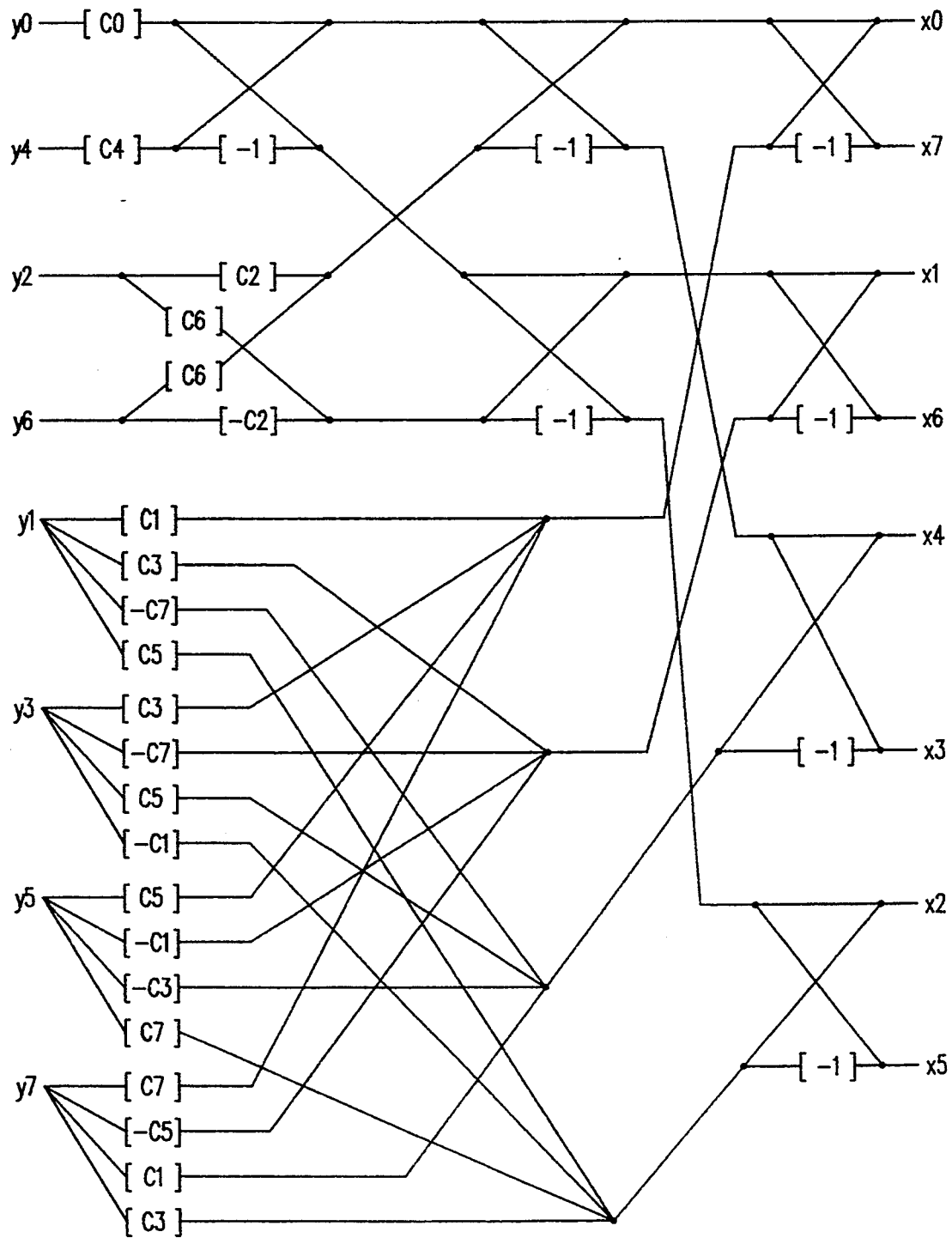
FIG. 9 shows a diagram illustrating a preferred decomposition of an 8-point inverse discrete cosine transform.
Figure 10:
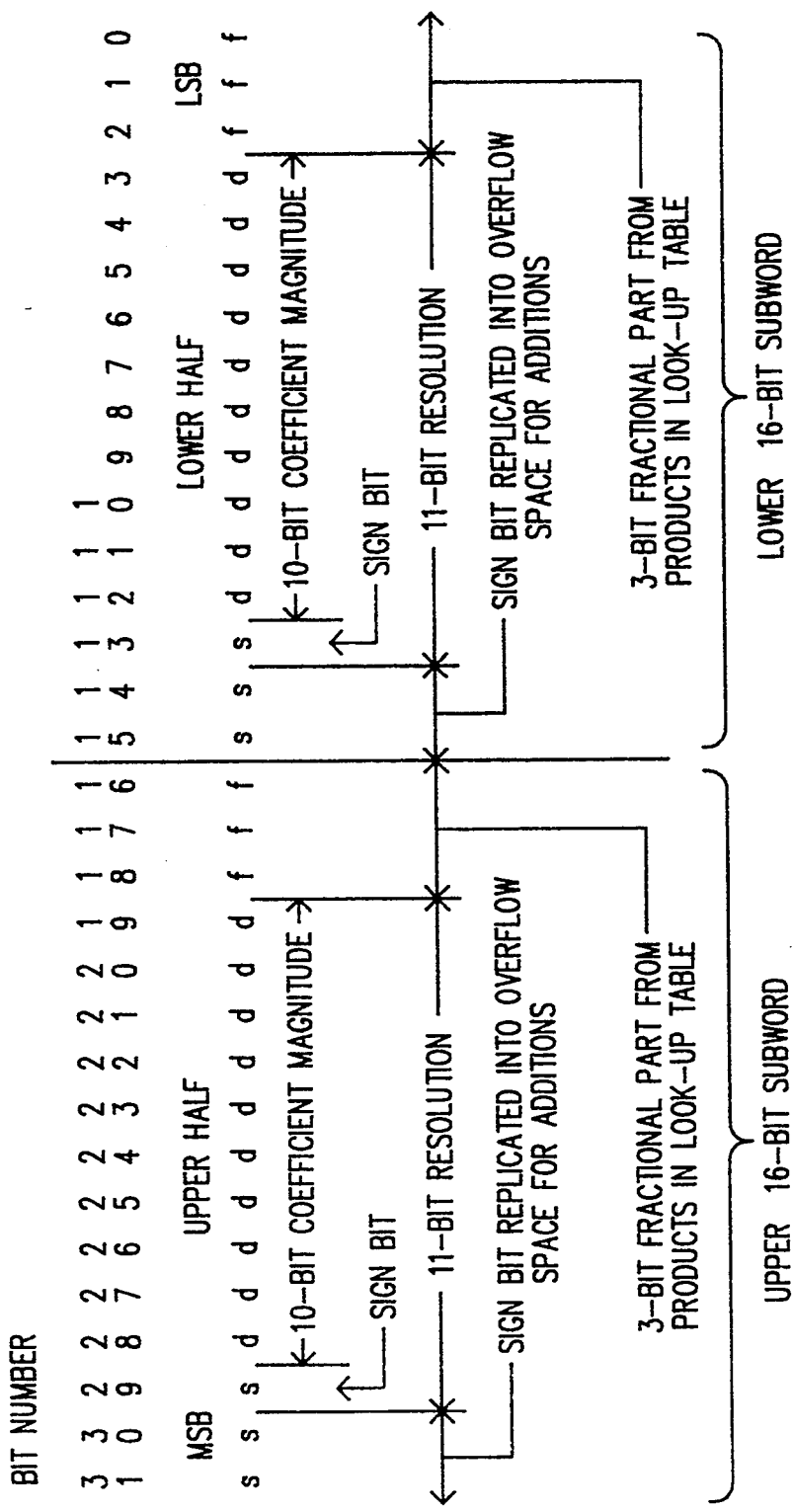
FIG. 10 is a diagram illustrating partitioning a 32-bit whole word into two 16-bit subwords for applying the invention to the 8-point IDCT shown in FIG. 9.
Figure 11:
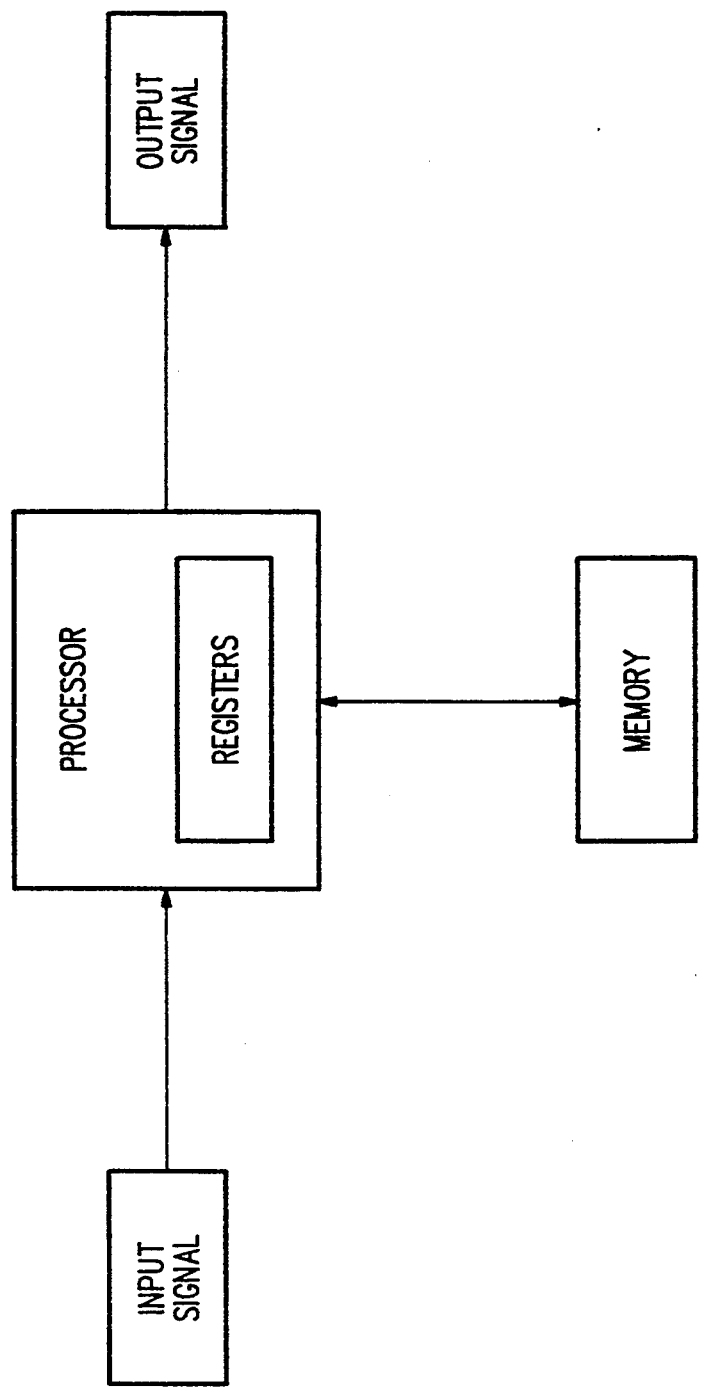
FIG. 11 shows a functional block diagram of a signal processing device.

The reversal of these standardized methods (decompression) involves the computation of the inverse discrete cosine transform among other steps. In the case of 11-bit coefficients and an 8-point IDCT, the subword method may be utilized to advantage. The signal flow graph corresponding to a preferred transform decomposition is shown in FIG. 9, and the requisite 16-bit partitioning of the 32-bit whole word is illustrated in FIG. 10. Practitioners skilled in the art will observe the scalar factor $1/(2\sqrt{2})$ in the 8-point IDCT may be advantageously factored out in each application of the one dimensional transform, in the separable computation of a multiple dimensioned transform, and be realized as a single factor of $\frac{1}{8}$ at the end.

Extremely fast execution of the IDCT function, which the invention makes possible, enables common small scale computers to receive image information in a compressed form from a digital storage medium and subsequently decompress the image information and present it on a cathode ray tube, or similar output device perceivable to a human observer, in less time than the uncompressed image ready for presentation could be handled in the same fashion. This performance is achieved by a software program utilizing the invention, running under the computer's usual operating system, without need for specialized electronic hardware as would normally be dedicated to said decompression function. Such performance has cost savings advantages in applications where the presentation of either still images or moving picture sequences are of interest. In the digital coding of sequences of images with a temporal relationship, as in movie pictures and video, significant reduction of the amount of information which must be stored to allow subsequent reconstruction of the sequence can be realized by using motion predicting methods. In such case not only are the usual still image data compression methods applied to the temporal sequence, but additionally the evolution of the sequence from one frame to the next may be coded in terms which need only describe where a portion of the prior image has moved to within the field of view. The proper encoding of such difference information requires the reconstruction of the already encoded information, according to the method to be subsequently used during decoding for presentation, so that the difference between that future image and the next to be presented may be accurately determined and encoded. Consequently it is desirable for every temporal image sequence encoding process to contain a decoding process within it; this is akin to the way in which successive approximation analog to digital conversion circuitry always contain digital to analog function. The inherent speed which the invention imparts to the decoding process is of great benefit to the practitioner creating a temporal image sequence encoding process. The present invention provides:

A method for computing transforms, characterized by utilizing:

a multiplying means;
an adding and subtracting means;
a plurality of storage means locations;
a means for manipulating specific subword portions of information contained in some of the plurality of storage means locations, and manipulating information between the multiplying means, the adding and subtracting means, and the storage means locations; and
a control means acting according to a specific decomposition of a transform to be computed, wherein the steps comprise:
establishing the value of the product of each transform starting datum and particular transform coefficients according to the transform decomposition;
placing said values in specific subword portions of assigned storage means locations according to the transform decomposition;
adding or subtracting the entire contents of one storage means location with the entire contents of other storage means locations, according to the transform decomposition, until all required sums of products have been formed; and then
recovering the ending transform results from specific portions of certain storage means locations, according to the transform decomposition.

A method for digitally encoding sequences of images, wherein the method is applied to the decoding of previously encoded information, so as to facilitate the estimation and encoding of differences between the source information being encoded and the image to be present upon subsequent decoding.

A digital electronic apparatus constructed to perform a method, wherein the multiplying means, adding and subtracting means, storage means, storage information manipulation means, and control means, are standard component circuits, or integrated circuit cells, having resolution at least twice the maximum which would be required by the numerical accuracy constraints of the transform application, were the method for computing transforms is not being applied.

A method wherein the multiplying means, adding and subtracting means, storage means, storage information manipulation means, and control means, are part of a general purpose computer of the Von Neuman machine type.

A method wherein the multiplying means is realized by a table look-up method whereby the universe of possible products, in the particular transform application being undertaken, is computed into a table before the initiation of the method, and the transform starting data are used to derive indices to the product values in said table wherefrom the values are retrieved instead of performing the multiplications.

A method for computing a multiple dimensional forward or inverse transform wherein the method is used one or more times in computing said multiple dimensional transform.

A method for computing an 8-point Inverse Discrete Cosine Transform wherein the control means effects computation and manipulation steps comprised of:
I) fill the packed products look-up table region of the storage means, for starting coefficients F having a finite range of values typically from $-R$ through $R-1$, wherein each table portion has adjacent half-words consistently in the lower/upper relation described in the following:

a) a first table portion containing all possible products of the form $F\cos(2\pi/16)$ in the lower part and $F\cos(6\pi/16)$ in the upper part;
b) a second table portion containing all possible products of the form $F\cos(6\pi/16)$ in the lower part and $-F\cos(2\pi/16)$ in the upper part;
c) a third table portion containing all possible products of the form $F\cos(\pi/16)$ in the lower part and $F\cos(3\pi/16)$ in the upper part;
d) a fourth table portion containing all possible products of the form $-F\cos(7\pi/16)$ in the lower part and $F\cos(5\pi/16)$ in the upper part;
e) a fifth table portion containing all possible products of the form $F\cos(3\pi/16)$ in the lower part and $-F\cos(7\pi/16)$ in the upper part; and
f) a sixth table portion containing all possible products of the form $F\cos(5\pi/16)$ in the lower part and $-F\cos(\pi/16)$ in the upper part.

II) acquire eight starting coefficients, F0, F1, F2, F3, F4, F5, F6, F7, which it is desired to apply the inverse transform to;
III) form the simple sum F0+F4 and difference F0−F4 (no multiplication required), and cause:
a) a first storage means location to contain the value F0+F4 in the lower part and the value F0−F4 in the upper part; and
b) a second storage means location to contain the value F0+F4 in the lower part and the value F0−F4 in the upper part;
IV) using the information manipulation means:
a) with the coefficient F2 as an index into the first table portion, cause a third storage means location to contain the $F2\cos(2\pi/16)$ and $F2\cos(6\pi/16)$ value pair extracted from the table;
b) with the coefficient F6 as an index into the second table portion, cause the $F6\cos(6\pi/16)$ and $-F6\cos(2\pi/16)$ value pair extracted from the table to be added to the whole value contained in the third storage means location, and the resulting value to be placed in said third location;
c) add the value in the third storage means location to the value in the first storage means location, with the resulting value to be placed in said first location;
d) subtract the value in the third storage means location from the value in the second storage means location, with the resulting value to be placed in said second location;
e) with the coefficient F1 as an index into the third table portion, cause a fourth storage means location to contain the $F1\cos(\pi/16)$ and $F1\cos(3\pi/16)$ value pair extracted from the table;
f) with said F1 as an index into the fourth table portion, cause a fifth storage means location to contain the $-F1\cos(7\pi/16)$ and $F1\cos(5\pi/16)$ value pair extracted from the table;
g) with the coefficient F5 as an index into the fifth table portion, cause the $F5\cos(3\pi/16)$ and $-F5\cos(7\pi/16)$ value pair extracted from the table to be subtracted from the whole value contained in the fifth storage means location, with the resulting value to be placed in said fifth location;
h) with said F5 as an index in the sixth table portion, cause the $F5\cos(5\pi/16)$ and $-F5\cos(\pi/16)$ value pair extracted from the table to be added to the whole value contained in the fourth storage means location, with the resulting value to be placed in said fourth location;

i) with the coefficient F3 as an index into the fifth table portion, cause the F3cos(3π/16) and −F3cos(7π/16) value pair extracted from the table to be added to the whole value contained in the fourth storage means location, with the resulting value to be placed in said fourth location;

j) with said F3 as index into the sixth table portion, cause the F3cos(5π/16) and −F3cos(π/16) value pair extracted from the table to be added to the whole value contained in the fifth storage means location, with the resulting value to be placed in said fifth location;

k) with the F7 coefficient as an index into the third table portion, cause the F7cos(π/16) and F7cos(3π/16) value pair extracted from the table to be added to the whole value contained in the fifth storage means location, with the resulting value to be placed in said fifth location;

l) with said F7 as index into the fourth table portion, cause the −F7cos(7π/16) and F7cos(5π/16) value pair extracted from the table to be subtracted from the value contained in the fourth storage means location, with the resulting value to be placed in said fourth location;

m) cause a duplicate of the value contained in the first storage means location to be placed into a sixth storage means location without alteration, then add the value contained in the fourth storage means location to the value contained in the first storage means location, with the resulting value to be placed in said first location;

n) cause the value contained in the fourth storage means location to be subtracted from the value contained in the sixth storage means location, with the resulting value to be placed in said sixth location;

o) cause a duplicate of the value contained in the second storage means location to be placed into a seventh storage means location without alteration, then cause the value contained in the fifth storage means location to be added to the value contained in the second storage means location, with the resulting value to placed in said second location; and p) cause the value contained in the fifth storage means location to be subtracted from the value contained in the seventh storage means location, with the resulting value to be placed in said seventh location;

V) with the information manipulation means extract the resulting transform output values f0, f1, f2, f3, f4, f5, f6, f7 as follows:

a) f0 is the value contained in the lower part of the first storage means location;

b) f1 is the value contained in the upper part of the first storage means location;

c) f2 is the value contained in the upper part of the second storage means location;

d) f3 is the value contained in the lower part of the seventh storage means location;

e) f4 is the value contained in the lower part of the second storage means location;

f) f5 is the value contained in the upper part of the seventh storage means location;

g) f6 is the value contained in the upper pan of the sixth storage means location; and h) f7 is the value contained in the lower part of the sixth storage means location.

A method of computing an 8-point by 8-point two-dimensional Inverse Discrete Cosine Transform wherein the method is applied to the 64 starting transform data values, the matrix of the resulting 64 intermediate values is transposed, and the method is applied to the 64 transposed values to yield a matrix of 64 ending values.

A high speed method for achieving the reconstruction of images from digital data, which has been previously subjected to Discrete Cosine Transform type compression methods, wherein the method is applied in a general purpose or reduced instruction set computing device.

A method for achieving temporally accurate reconstruction and presentation of sequences of images (such as moving pictures and video), which have been previously subjected to Discrete Cosine Transform type compression methods, wherein the method is applied repeatedly.

A method for transmitting digital image data, and sequences of said images, wherein the method is applied in the performance of a Forward Discrete Cosine Transform type of encoding and data compression, and the method is applied in the performance of an Inverse Discrete Cosine Transform type of decoding and data decompression.

A method wherein said general purpose computer will act according to the instruction set of Intel (trademark) Corporation microprocessors having registers of at least 32-bit resolution, performing an 8-point Inverse Discrete Cosine Transform according to the following assembly language source code:

```
MOV EAX, [ES:SI]        ; get F0//F4 starting coefficients in
                          packed format
MOV EBX, EAX            ; and duplicate
ROL EAX, 10h            ; word swap
NEG BX                  ; prep for single instruction butterfly
SUB EAX, EBX            ; form F0+F4 // F0-F4 into first
MOV EDX, EAX            ; and duplicate into second
MOV EBX, [ES:SI+4]      ; get F2 // F6 starting coefficients in
                          packed format
AND EBX, 0FFF8FFF8h     ; mask for lookup indexed by F2
MOV ECX, [BX+COS26]     ; extract packed products
                          F2C2 // F2C6 into third
SHR EBX, 10h            ; shift F6 into BX for next lookup
ADD ECX, [BX+COS62]     ; add packed products F6C6 // -F6C2
                          into third
ADD EAX, ECX            ; butterfly summation branch into first
SUB EDX, ECX            ; and difference branch into second
MOV EBX, [ES:SI+8]      ; get F1 // F5 starting coefficients in
                          packed format
AND EBX, 0FFF8FFF8h     ; mask for lookup indexed by F1
MOV EBP, [BX+COS13]     ; extract packed products
                          F1C1 // F1C3 into fourth
MOV EDI, [BX+COS75]     ; extract packed products
                          -F1C7 // F1C5 into fifth
SHR EBX, 10h            ; shift F5 into BX for next lookup
SUB EDI, [BX+COS37]     ; subtract packed products
                          F5C3 // -F5C7 from fifth
ADD EBP, [BX+COS51]     ; add packed products F5C5 // -F5C1
                          to fourth
MOV EBX, [ES:SI+12]     ; get F3 // F7 starting coefficients in
                          packed format
AND EBX, 0FFF8FFF8h     ; mask for lookup indexed by F3
ADD EBP, [BX+COS37]     ; add packed products F3C3 // -F3C7
                          to fourth
ADD EDI, [BX+COS51]     ; add packed products F3C5 // -F3C1
                          to fifth
SHR EBX, 10h            ; shift F7 into BX for next lookup
ADD EDI, [BX+COS13]     ; add packed products F7C1 // F7C3
```

-continued

| | |
|---|---|
| | to fifth |
| SUB EBP, [BX+COS75] | ; subtract packed products -F7C7 // F7C5 from fourth ; now finish butterflies and write pixels |
| MOV EBX, EAX | ; |
| ADD EAX, EBP | ; |
| MOV [ES:SI], EAX | ; packed output f0 // f1 returned to storage |
| SUB EBX, EBP | ; sixth now contains packed output f7 // f6 |
| ROL EBX, 10h | ; do word swap for preferred ordering in output |
| MOV [ES:SI+12], EBX | ; packed output f6 // f7 to storage, sixth now free |
| MOV EBX, EDX | ; duplicate second into sixth since no seventh available |
| ADD EDX, EDI | ; second now contains packed output f4 // f2 |
| SUB EBX, EDI | ; sixth now contains packed output f3 // f5 |
| XCHG BX, DX | ; now have f3 // f2 and f4 // f5 |
| MOV [ES:SI+8], EBX | ; packed output f4 // f5 returned to storage |
| ROL EDX, 10h | ; do word swap for preferred ordering in output |
| MOV [ES:SI+4], EDX | ; packed output f2 // f3 returned to storage |

The foregoing description of the preferred embodiments of the present invention have been presented for purposes of illustration and description. It is not intended to be exhaustive or to limit the invention to the precise form disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. A signal processing method comprising the steps of:
    receiving a first signal representing information in compressed form to a processor, the processor having a plurality of registers, the information being compressed using a discrete transform technique;
    processing whole words of the first signal according to bit length;
    partitioning at least one of the whole words into a plurality of subwords;
    inverse discrete transforming each of the plurality of subwords in accordance with decomposition control of the processor for determination of all discrete values associated with the plurality of subwords for the one of the whole words prior to passing another of the whole words to the processor for processing; and
    concatenating the plurality of subwords using the discrete values for forming the one of the whole words for providing a second signal representing the information in decompressed form.

2. The method of claim 1 further comprising the step of temporarily storing the discrete values in the plurality of registers.

3. The method of claim 2 wherein the information is compressed using a linear, discrete orthogonal transform technique.

4. The method of claim 3 wherein each of the plurality of subwords do not have excursions of value which disturb any other ones of the plurality of subwords.

5. The method of claim 3 wherein the information in compressed form is associated with transform coefficients, the whole words being representations of encoded transform coefficients, the whole words being variable length data strings of a data stream.

6. The method of claim 5 wherein the transform coefficients are specifically limited within a range of values owing to resolution limits associated with the information.

7. The method of claim 6 wherein the discrete values associated with the plurality of subwords are derived from transform partial products formed with the transform coefficients.

8. The method of claim 7 wherein the one of the whole words is partitioned into the plurality of subwords for arithmetically operating on the transform partial products of all the plurality of subwords simultaneously.

9. The method of claim 8 wherein the transform coefficients represent multidimensional data sequences.

10. The method of claim 9 comprising the step of sequentially processing each of the whole words.

11. The method of claim 10 wherein the processor is a program-controlled microprocessor which is an integer processor and not a floating point processor.

12. The method of claim 11 wherein the one of the whole words represents one integer, and the plurality of subwords each represent any of a variety of another integer smaller than the one integer.

13. The method of claim 5 wherein the transform coefficients are used to form transform partial products which are temporarily stored in the plurality of registers.

14. The method of claim 13 wherein the transform partial products are determined and combined to form register values.

15. The method of claim 13 wherein transform partial products are added and subtracted to form register values.

16. The method of claim 14 or claim 15 wherein ones of the register values are combined to form upper and lower subword portions.

17. The method of claim 16 wherein the transform partial products are not pre-computed but are determined in real-time by multiplication using the processor and then temporarily stored in some of the plurality of registers.

18. The method of claim 16 wherein the transform partial products are pre-computed and stored in memory in at least one look-up table for recall and subsequent temporary storage in some of the plurality of registers.

19. The method of claim 18 wherein the transform coefficients are used as indices to the look-up table.

20. The method of claim 19 wherein the entire step of inverse discrete transforming using an inverse discrete cosine transform can be completed in equivalent to four additions.

21. The method of claim 19 wherein the transform partial products are further combined as appropriate for pre-computing the discrete values of the plurality of subwords, the discrete values are then grouped to form the whole words, and the whole words are stored in the look-up table.

22. The method of claim 21 wherein the transform coefficients are for single and multiple dimensional Discrete Cosine Transform for image compression.

23. The method of claim 21 wherein the transform coefficients are for real and complex Fast Fourier Transform for compression of time sequence data.

24. The method of claim 5 wherein the whole words are parsed into data strings representing individual ones of the encoded transform coefficients, each of the subwords being a data string representing an encoded transform coefficient.

25. The method of claim 2 wherein the discrete transform technique is subject to expression as a regular, lattice-type signal flow graph.

26. The method of claim 25 wherein the regular, lattice-type signal flow graph includes repeating structures selected from the group consisting of triad notation and two-element by two-element butterfly notation.

27. The method of claim 2 wherein the discrete transform technique is selected from the group consisting of Discrete Fourier Transform, Karhunen-Loeve Transform, Walsh-Hadamard Transform, Discrete Hartley Transform, Z-Transform, and Discrete Cosine Transform.

* * * * *